March 25, 1941.  C. C. CRAVEN  2,236,285
PISTON EXPANDER
Filed Feb. 7, 1940  2 Sheets-Sheet 1
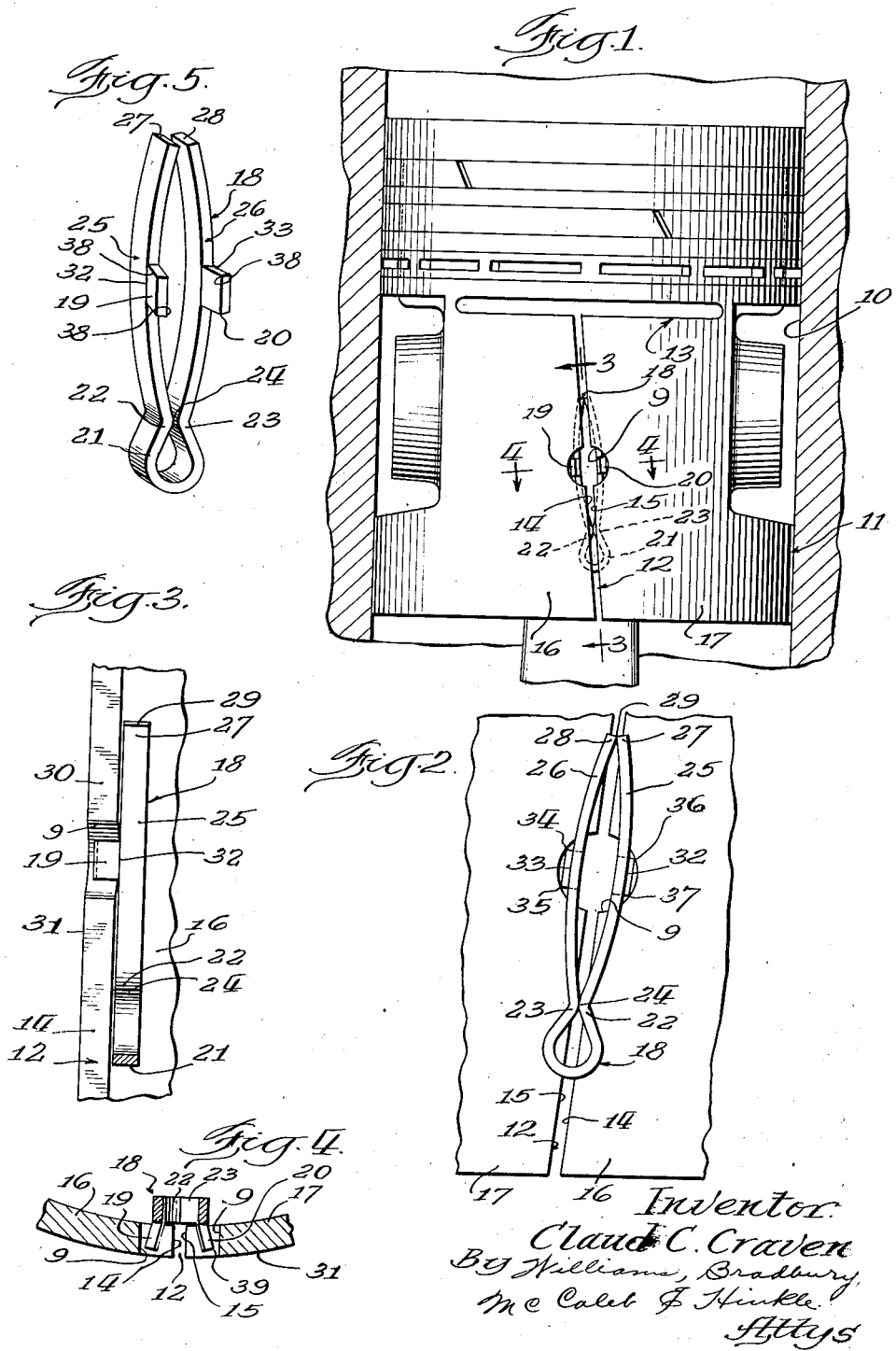
Inventor:
Claude C. Craven
By Williams, Bradbury,
McCaleb & Hinkle
Attys March 25, 1941.  C. C. CRAVEN  2,236,285
PISTON EXPANDER
Filed Feb. 7, 1940    2 Sheets-Sheet 2
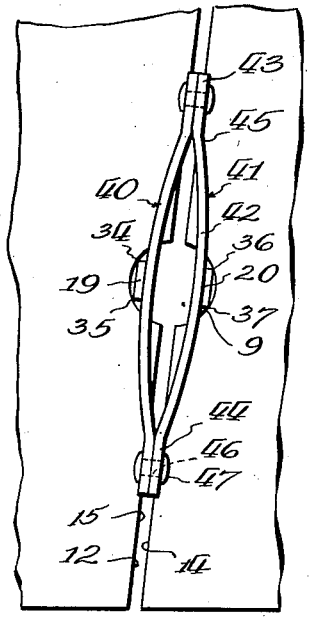
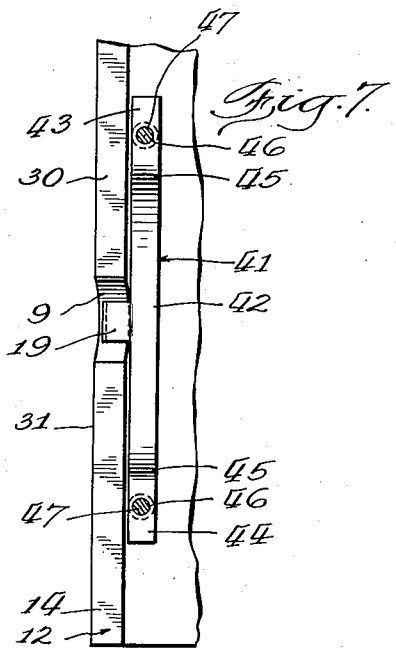
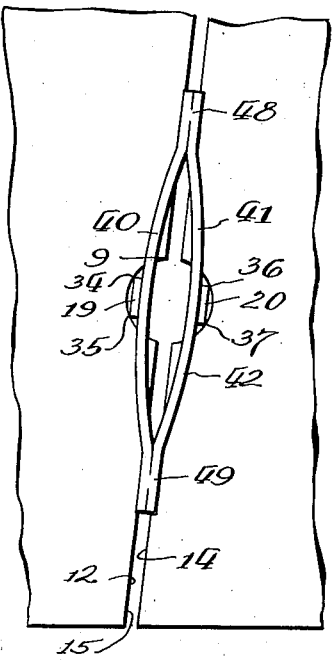
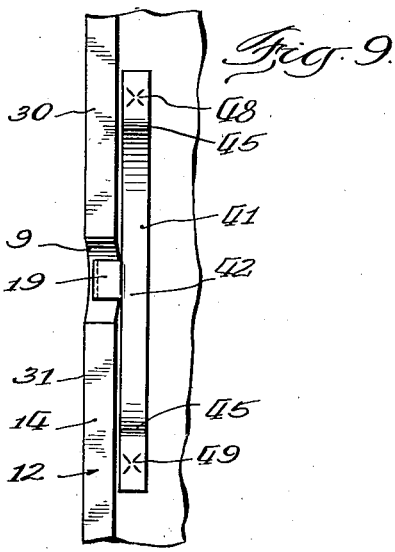
Inventor
Claud C. Craven
By Williams, Bradbury,
McColet & Hinkle
Attys.

Patented Mar. 25, 1941

2,236,285

UNITED STATES PATENT OFFICE 2,236,285

PISTON EXPANDER

Claud C. Craven, Centralia, Mo., assignor to A. B. Chance Company, Centralia, Mo., a corporation of Missouri Application February 7, 1940, Serial No. 317,705

10 Claims. (Cl. 309—12)

The present invention relates to piston expanders, and is particularly concerned with a piston expander which is an improvement over my prior patent, No. 2,158,355, issued May 16, 1939, on Piston expanders.

One of the objects of the invention is the provision of an improved piston expander adapted to exert a resilient pressure in opposite directions against the marginal walls of the split of a piston skirt which is adapted to be used for a long period of time with a minimum amount of breakage or necessity for repairs.

Another object of the invention is the provision of an improved piston expander of the class described which is peculiarly adapted to be retained in place on the piston, and which is capable of quick and easy installation for the reason that it is only necessary to bore a single hole in the piston wall, and it is not necessary to cut off any part of the expander.

Another object of the invention is the provision of an improved piston expander in which the forces of expansion are balanced with respect to both ends of the expander so that there is no tendency for the expander to twist out of place and so that the expander may exert a greater pressure with the use of a minimum amount of material.

Another object of the invention is the provision of an improved piston expander of the type having laterally projecting lugs engaging the walls of an aperture in a piston, in which the expansion and contraction of the expander maintains these lugs in substantially parallel position so that the wear between the corners of the lugs and the aperture is reduced to a minimum, and the expander will be retained in its place for a long period of time.

Another object of the invention is the provision of an improved piston expander of the resilient type, which is of the full elliptical spring shape and which is adapted to be constructed of flat spring stock of rectangular cross section.

Another object of the invention is the provision of an improved piston expander which is simple, sturdy, effective, and adapted to be manufactured economically.

Referring to the two sheets of drawings accompanying this specification:

Fig. 1 is a vertical elevational view of a piston equipped with a piston expander constructed according to the invention;

Fig. 2 is a fragmentary elevational view of the inner wall of the piston and piston expander;

Fig. 3 is a fragmentary side elevational view with the end of the expander in section, taken on a plane passing through the line 3—3, through the slot of the piston skirt;

Fig. 4 is a fragmentary transverse sectional view taken on the plane of the line 4—4 of Fig. 4, looking in the direction of the arrows;

Fig. 5 is a view in perspective of the piston expander.

Fig. 6 is a view similar to Fig. 2 of a modification made of two pieces of metal riveted together;

Fig. 7 is a view similar to Fig. 3 of the modification of Fig. 6;

Fig. 8 is a view similar to Fig. 6 of another modification made of two pieces of metal welded together;

Fig. 9 is a view similar to Figs. 3 and 7 of the modification of Fig. 8.

Referring to Fig. 1, 10 indicates the wall of the cylinder which is provided with a piston 11, having its skirt provided with a longitudinally extending slot 12 and a horizontally extending slot 13. The edges of the skirt wall adjacent the slot 12 have been indicated by the numerals 14 and 15, and the adjacent portions of the skirt by the numerals 16 and 17.

In order to provide for the installation of the expander, which is indicated in its entirety by the numeral 18, the skirt parts 16 and 17 are provided with a cylindrical aperture 9, preferably centrally located so that its center is in the plane of the center of the slot 12, and the bore 9 is also preferably located about midway between the upper and lower boundaries of the skirt portions 16 and 17.

In some embodiments of the invention the position of the bore 9 may be varied upward or downward, depending upon the relative stiffness of the skirt, and in some embodiments of the invention two or three expanders might be used; but in general there is room for but one, and only one expander is usually all that is necessary.

The piston expander is shown in perspective in Fig. 5 and in elevation in Fig. 2. Fig. 2 differs in that the expander is installed, and therefore its parts are compressed together.

The expander is preferably made of relatively thick steel strip of rectangular cross section, and it is preferably provided with a pair of integral laterally projecting lugs 19 and 20, which are rectangular in cross section. The steel strip of which the expander is made is preferably formed with an oval loop 21 at one end, the loop having its adjacent parts 22 and 23 brought almost into contact on the inside of the loop when the expander is in the position of Fig. 5, apart from the piston.

In other embodiments of the invention, the parts 22 and 23 of the loop may actually be in contact before the expander is installed; but this is not necessary, as the pressure which is put upon the expander in its installation brings the parts of the loop together at the point 24.

It should be noted that the expander is bent across its smallest dimension, and the two legs 25 and 26 of the expander are preferably identical in shape, but oppositely disposed. These legs are integrally formed with the oval loop 21, and they are preferably of elliptical shape and the same length.

The legs 25 and 26 are also so arranged that the two ends 27 and 28 of the spring legs are closely adjacent before the expander is placed in the piston, as shown in Fig. 5, so that the inner sides of these legs adjacent the ends 27 and 28 may be brought into contact at the point 29 (Fig. 2).

In some embodiments of the invention the expander may be so shaped that these parts are in contact at the point 29, before the expander is placed in the piston; but this is not necessary, provided the parts come into contact when they are installed in the piston, as shown in Fig. 2.

The laterally projecting lugs 19, 20 may be described as being substantially midway between the ends of the elliptical spring formations 25 and 26; that is, substantially midway between the points of contact 24 and 29, but the location of these lugs is preferably slightly off center, for the purpose of better effecting the results desired. For example, it is the outermost pointed corners 36 of these lugs which engage in the aperture 9, and it is my object that as the expander contracts and expands with the walls of the piston, the lugs 19 and 20 shall keep their transversely extending corner edges 39 substantially parallel to each other.

If these edges 39 are kept substantially parallel to each other, then the sharp pointed corners 34 to 37 will be kept in such relation that they may bite into the walls of the aperture, forming a socket which is not worn or changed by the movement of the expander.

Stated in another way, it is my object that the line extending between the corners 34 and 35 and the line between the corners 36 and 37 of Fig. 2 shall be kept parallel as the expander contracts and expands. This would permit the sharp corners 34 to 37 to engage the wall of the aperture 9 at exactly the same point at all times, and these sharp corners 34 to 37 would form their own sockets, but the sockets would not be subject to such wear or enlargement as is involved when the lugs 19, 20 are constantly tilting.

I find that on account of the increased stiffness of the spring legs 25 and 26 at the lower end of Fig. 2, between the point 24 and the center of the spring, the lugs 19 and 20 should be located slightly closer to the free ends 27 and 28 of the elliptical springs than they are to the point 24. I believe that this increased stiffness of the springs at the lower end of the expander, as distinguished from the upper end of the expander, is due to the fact that they are joined by the loop 18 beyond the point of contact 24.

As a matter of actual practice, the point of location which would compensate for this increased stiffness has been determined by the trial location of the lugs at different points on the legs 25, 26 until a point has been found at which the lines 34, 35 and 36, 37 remain parallel during expansion and contraction of the springs.

As far as the naked eye can judge, the lugs 19, 20 are substantially midway between the points 29 and 24, but close measurement will disclose that the lugs are slightly closer to the point 29 than they are to the point 24 and that the transverse elements of the lugs 19 and 20 remain parallel as the expander expands and contracts.

The projecting lugs 19, 20 are also preferably made shorter than the thickness of the wall 30 of the piston skirt, as shown in Fig. 3, so that these lugs do not project through the piston wall, but terminate inside of the outer wall 31 of the piston.

The expanders are made of hard and tempered spring steel stock, and it is of great advantage that it is not necessary to cut off any part of the projecting lugs 19 or 20 after the expander has been installed, as is necessary with many of the devices of the prior art.

The retaining lugs 19 and 20 are preferably bent laterally at the points 32 and 33 so that they extend diagonally outward slightly, and only the outermost corners 34, 35, 36, and 37 are brought into engagement with the cylindrical wall of the bore 9.

The flat sides of the lugs 19 and 20 do not engage the wall of the bore because, as will be seen in Fig. 2, those parts extend across from one part of the circular wall to another part in the bore in the manner of a segment.

The corners 38 of the lugs 19 and 20 do not engage the walls of the bore 9 for the reason that the lugs 19 and 20 extend diagonally outward, and only the outermost points 34 to 37 at the ends of the lugs 19 and 20 actually engage the walls of this bore.

Referring to Figs. 6 to 9, these are views showing two different modifications, the upper and lower parts being entirely symmetrical, in which the lugs 19 and 20 may be located between the ends of the springs.

These expanders are each made of two pieces of strip steel of the same material as Figs. 1 to 5, the two pieces being similar in shape and secured together at each end. For example, the two pieces 40, 41 of the expander of Fig. 6 may each have a centrally located elliptical portion 42 and a pair of longitudinally extending attaching flanges 43, 44, at each end. The attaching flanges are integrally joined to the elliptical spring portion 42 at a bend 45, which is sufficient to bring the two attaching flanges of two oppositely located members 40, 41 into parallel contacting relation.

Each of the attaching flanges 43, 44 is provided with a through aperture 46, and the two pieces 40 and 41 are secured together by rivets 47. As both ends of the expander are symmetrical in this case, the lugs 19 and 20 may be located midway between the ends of the expander for the purpose of assuring the parallelism of the lines joining the engaging corners 34 to 37 at all times.

Referring to Figs. 8 and 9, these show a modification in which the spring members 40, 41 are similar to those described with regard to Fig. 6, but they are secured together by the spot welds 48, 49 at each end, instead of the rivets 47. The use of spot welding eliminates the necessity for drilling or punching apertures in relatively hard and tough spring stock, and reduces the cost of manufacturing an expander of this type.

Referring to Fig. 4, it will be observed that there appears to be a slight clearance between the outermost corners 39 in this figure and the walls of the bore 9. This is so because it is the points 34 to 37 which are engaging the bore 9.

The expanders may be installed in the piston by compressing the expanders with a suitable compression tool and inserting the lugs 19 and 20 in the bore 9.

In general, the legs of the expander should extend longitudinally of the slot so that these elliptical springs will tend to urge the walls of the slot apart and thus to urge the skirt of the piston apart into engagement with the cylinder wall.

It will thus be observed that I have invented an improved expander in which the spring members are of elliptical shape, and the supporting lugs are disposed about midway of the ends of such an elliptical spring, so that balanced forces are exerted on the supporting lugs and parts of the expander.

The present expanders are adapted to have their sharp corners bite into the walls of the bore of the piston so as to retain the expander in place; and because of the engagement of the adjacent parts of the legs at each end, a very powerful expanding action can be exerted by this relatively small spring expander.

The expander has a high degree of resilience, due to its structure and shape, and may be manufactured at a low cost because it consists merely of one integral part made of rectangular stock. The expander can be installed very quickly and cheaply because it is only necessary to bore an ordinary cylindrical hole, and it is not necessary to make the holes of special shape, or to make holes extending in different directions.

The position of the supporting lugs is such that they remain parallel as the expander is squeezed together, and also while the expander is flexing and in operation in a piston. This avoids wear where the lugs contact the piston, and prolongs the effective life of the piston expander.

I have found that the structure of the present expander eliminates breakage or setting, and that the present expander is adapted to be used for long periods of time without replacement or repair.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A piston expander comprising an integral member having a pair of longitudinally extending legs of resilient metal stock, each of said legs being provided with a centrally located and laterally projecting supporting lug adapted to extend into an aperture bored in a piston at the skirt slot and having sharp points for engaging the opposite sides of said aperture, the said legs being of substantially elliptical shape and being oppositely curved.

2. A piston expander comprising an integral member having a pair of longitudinally extending legs of resilient metal stock, each of said legs being provided with a centrally located and laterally projecting supporting lug adapted to extend into an aperture bored in a piston at the skirt slot for engaging the opposite sides of said aperture, the said legs being of substantially elliptical shape and being oppositely curved, and the said lugs being outwardly bent away from each other out of the plane of said legs, whereby the end points of said lugs engage the walls of the bore in the piston skirt.

3. A piston expander comprising an integral member having a pair of longitudinally extending legs of resilient metal stock, each of said legs being provided with a centrally located and laterally projecting supporting lug adapted to extend into an aperture bored in a piston at the skirt slot for engaging the opposite sides of said aperture, the said legs being of substantially elliptical shape and being oppositely curved, and the said lugs being outwardly bent away from each other out of the plane of said legs, whereby the end points of said lugs engage the walls of the bore in the piston skirt, said lugs being formed with flat ends and flat sides forming a pair of outer corners on each lug adapted to bite into the wall of the bore in said piston skirt.

4. A piston expander comprising an integral member having a pair of longitudinally extending legs of resilient metal stock, each of said legs being provided with a centrally located and laterally projecting supporting lug adapted to extend into an aperture bored in a piston at the skirt slot and having sharp points for engaging the opposite sides of said aperture, the said legs being joined together by a loop of metal, and the legs contacting each other at the juncture with said loop and at their free ends when installed in the piston.

5. A piston expander comprising an integral member having a pair of longitudinally extending legs of resilient metal stock, each of said legs being provided with a centrally located and laterally projecting supporting lug adapted to extend into an aperture bored in a piston at the skirt slot for engaging the opposite sides of said aperture, the said legs being of substantially elliptical shape and being oppositely curved, and the said lugs being outwardly bent away from each other out of the plane of said legs, whereby the corner points of said lugs engage the walls of the bore in the piston skirt, the said legs being joined together by a loop of metal, and the legs contacting each other at the juncture with said loop and at their free ends when installed in the piston.

6. A piston expander comprising a substantially elliptical member made of strip spring steel having oppositely formed elliptical portions bowed away from each other and having the ends of these elliptical portions engaged with each other, said elliptical portions being formed with integral laterally extending lugs which are substantially rectangular in cross-section and which are outwardly bent in such manner that the lugs are adapted to have their extreme outer corner points engaged in an aperture formed between the adjacent edges of the walls of a piston, the said lugs being symmetrically located and the said elliptical portions having substantially the same characteristics on both sides of said lugs whereby the flexure of the expander in the piston does not tend to change the position of engagement of said points with the piston.

7. A piston expander comprising a substantially elliptical member made of strip spring steel having oppositely formed elliptical portions bowed away from each other and having the ends of these elliptical portions engaged with each other, said elliptical portions being formed with integral laterally extending lugs which are substantially rectangular in cross-section and which are outwardly bent in such manner that the lugs are adapted to have their extreme outer corner points engaged in an aperture formed between the adjacent edges of the walls of a piston, the said lugs being symmetrically located and the said elliptical portions having substantially the same characteristics on both sides of said lugs whereby the flexure of the expander in the piston does not tend to change the position of engagement of said points with the piston, said expander being formed of two pieces of similar size and shape with the lateral lugs oppositely bent.

8. A piston expander comprising a substantially elliptical member made of strip spring steel having oppositely formed elliptical portions bowed away from each other and having the ends of these elliptical portions engaged with each other, said elliptical portions being formed with integral laterally extending lugs which are substantially rectangular in cross-section and which are outwardly bent in such manner that the lugs are adapted to have their extreme outer corner points engaged in an aperture formed between the adjacent edges of the walls of a piston, the said lugs being symmetrically located and the said elliptical portions having substantially the same characteristics on both sides of said lugs whereby the flexure of the expander in the piston does not tend to change the position of engagement of said points with the piston, said expander being formed of two pieces of similar size and shape with the lateral lugs oppositely bent, the said ends of said elliptical portions being brought into substantial parallelism and secured together.

9. A piston expander comprising a substantially elliptical member made of strip spring steel having oppositely formed elliptical portions bowed away from each other and having the ends of these elliptical portions engaged with each other, said elliptical portions being formed with integral laterally extending lugs which are substantially rectangular in cross-section and which are outwardly bent in such manner that the lugs are adapted to have their extreme outer corner points engaged in an aperture formed between the adjacent edges of the walls of a piston, the said lugs being symmetrically located and the said elliptical portions having substantially the same characteristics on both sides of said lugs whereby the flexure of the expander in the piston does not tend to change the position of engagement of said points with the piston, said expander being formed of two pieces of similar size and shape with the lateral lugs oppositely bent, the said ends of said elliptical portions being brought into substantial parallelism and spot-welded together.

10. A piston expander comprising a substantially elliptical member made of strip spring steel having oppositely formed elliptical portions bowed away from each other and having the ends of these elliptical portions engaged with each other, said elliptical portions being formed with integral laterally extending lugs which are substantially rectangular in cross-section and which are outwardly bent in such manner that the lugs are adapted to have their extreme outer corner points engaged in an aperture formed between the adjacent edges of the walls of a piston, the said lugs being symmetrically located and the said elliptical portions having substantially the same characteristics on both sides of said lugs whereby the flexure of the expander in the piston does not tend to change the position of engagement of said points with the piston, the said expander being formed of one integral piece of metal with its elliptical portions joined at one end by a loop and the ends of said loop and elliptical portions contacting each other.

CLAUD C. CRAVEN.